(12) United States Patent
Richman et al.

(10) Patent No.: US 9,022,699 B2
(45) Date of Patent: May 5, 2015

(54) METHOD AND SYSTEM FOR LOCALLY CONTROLLING SUPPORT OF A FLAT OBJECT

(71) Applicant: Coreflow Ltd, Yokneam Elite (IL)

(72) Inventors: Hilel Richman, Haifa (IL); Oded Yehoshua Licht, Haifa (IL); Oded Hamburger, Haifa (IL); Yuval Yassour, Kibbutz Hasolelim (IL); Boaz Nishri, Kibbutz Maagan Michael (IL); Arie Harnik, Haifa (IL); Alla Soudakovitch, Haifa (IL); Shay Levavy, Haifa (IL)

(73) Assignee: Coreflow Ltd, Daliat el Carmel (IL)

( * ) Notice: Subject to any disclaimer, the term of this patent is extended or adjusted under 35 U.S.C. 154(b) by 0 days.

(21) Appl. No.: 14/181,732

(22) Filed: Feb. 17, 2014

(65) Prior Publication Data

US 2014/0161577 A1 Jun. 12, 2014

Related U.S. Application Data

(62) Division of application No. 12/921,336, filed as application No. PCT/IL2009/000274 on Mar. 11, 2009, now Pat. No. 8,690,489.

(60) Provisional application No. 61/035,453, filed on Mar. 11, 2008, provisional application No. 61/041,275, filed on Apr. 1, 2008.

(51) Int. Cl.
*B65G 53/00* (2006.01)
*B65G 51/03* (2006.01)
*B65H 5/22* (2006.01)

(52) U.S. Cl.
CPC ........ *B65G 51/03* (2013.01); *B65H 5/22* (2013.01); *B65H 2406/112* (2013.01); *B65H 2406/1132* (2013.01); *B65H 2406/364* (2013.01)

(58) Field of Classification Search
USPC ............ 406/88; 414/676; 271/195; 65/182.2; 108/50.13
See application file for complete search history.

(56) References Cited

U.S. PATENT DOCUMENTS

| | | | |
|---|---|---|---|
| 4,730,956 A | 3/1988 | Lenhart | |
| 4,819,928 A | 4/1989 | Osborn et al. | |

(Continued)

FOREIGN PATENT DOCUMENTS

| | | |
|---|---|---|
| CN | 1817767 | 3/2006 |
| CN | 101133488 | 2/2008 |

(Continued)

OTHER PUBLICATIONS

Office Action for European Application No. 09720091.9 dated Feb. 18, 2014.

(Continued)

*Primary Examiner* — Joseph Dillon, Jr.
(74) *Attorney, Agent, or Firm* — Pearl Cohen Zedek Latzer Baratz LLP (57) ABSTRACT

A non-contact support platform system is provided for supporting a substantially flat object. The system includes a platform with a first plurality of pressure ports and a first plurality of vacuum ports for inducing a fluid cushion to support the object at a distance from the platform. The system further includes a second plurality of pressure ports located at a predetermined zone of the platform for increasing the distance of the object from the platform at the predetermined zone.

5 Claims, 7 Drawing Sheets

(56) References Cited

U.S. PATENT DOCUMENTS

| | | | |
|---|---|---|---|
| 5,183,251 | A | 2/1993 | Sardella |
| 5,437,521 | A | 8/1995 | Ouellette |
| 5,447,375 | A | 9/1995 | Ochiai et al. |
| 5,549,423 | A | 8/1996 | Lenhart |
| 5,832,826 | A | 11/1998 | Mack et al. |
| 6,523,572 | B1 | 2/2003 | Levin et al. |
| 6,630,633 | B1 | 10/2003 | Uber et al. |
| 6,644,703 | B1 | 11/2003 | Levin et al. |
| 6,808,358 | B1 | 10/2004 | Mayerberg et al. |
| 7,530,778 | B2 | 5/2009 | Yassour et al. |
| 7,604,439 | B2 | 10/2009 | Yassour et al. |
| 7,908,995 | B2 | 3/2011 | Inamasu et al. |
| 8,083,896 | B2 | 12/2011 | Hughes |
| 2006/0054774 | A1 | 3/2006 | Yassour et al. |
| 2006/0096395 | A1 | 5/2006 | Weiss et al. |
| 2007/0014494 | A1 | 1/2007 | Wardman et al. |
| 2007/0175499 | A1 | 8/2007 | Yassour et al. |
| 2008/0145190 | A1 | 6/2008 | Yassour et al. |
| 2008/0302637 | A1 | 12/2008 | Yassour |
| 2012/0031147 | A1 | 2/2012 | Arai et al. |

FOREIGN PATENT DOCUMENTS

| | | |
|---|---|---|
| JP | 2004/279335 | 10/2004 |
| JP | 2004/331265 | 11/2004 |
| JP | 2005-119818 | 5/2005 |
| JP | 2006 222209 | 8/2006 |
| WO | WO 01/14782 | 3/2001 |

OTHER PUBLICATIONS

Office Action for Japanese Application No. 2010-550328 dated Jun. 24, 2014.

International Search Report for PCT application No. PCT/IL2009/000274 mailed Jun. 26, 2009.

Supplementary European Search Report for European Patent Application No. 09720091.9 mailed Aug. 6, 2012.

Japanese Office Action for Application No. 2010-550328 mailed Sep. 17, 2013.

Chinese Office Action for Application No. 200980116898.6 mailed Jul. 30, 2013.

METHOD AND SYSTEM FOR LOCALLY CONTROLLING SUPPORT OF A FLAT OBJECT

CROSS REFERENCE TO RELATED APPLICATIONS

This application is a Divisional application of U.S. patent application Ser. No. 12/921,336, published on Feb. 3, 2011 as United States Patent Publication Number 2011/0023757A1, which is a National Phase Application of PCT International Application No. PCT/IL09/000,274, International Filing Date Mar. 11, 2009, entitled "Method and System for Locally Controlling Support of a Flat Object", published on Sep. 17, 2009 as International Publication Number WO 2009/113066, which claims priority of U.S. Provisional Patent Application No. 61/035,453 filed on Mar. 11, 2008 and of U.S. Provisional Patent Application No. 61/041,275 filed on Apr. 1, 2008.

FIELD OF THE INVENTION

The present invention relates to non-contact platforms. More particularly, the present invention relates to a method and system for locally controlling support of a flat object.

BACKGROUND OF THE INVENTION

Non-contact platforms for the conveyance of thin flat objects have many applications. Examples of such applications include conveying silicon substrates or glass panes during the fabrication of flat panel displays (FPD) or solar cells. During the fabrication process, the object may be transported to various locations for the performance of such operations as inspection, cleaning, coating, heating, and etching. A typical non-contact conveyance system may include a precisely formed rigid surface on which are distributed sources or ports of injected pressurized fluid (as described by Levin et al. in U.S. Pat. No. 6,523,572), of vacuum or suction (described by Levin et al in U.S. Pat. No. 6,644,703), or of both pressurized fluid and vacuum (Yassour et al. in US Patent Appl. Publ. No. 2006/0054774), all of which are incorporated herein by reference. Ports through which fluid is injected or evacuated may include self adaptation segmented orifice (SASO) nozzle devices, as described by Levin et al. in Intl. Patent Appl. Publ. No. WO 01/14782, and also in U.S. Pat. No. 6,523,572, U.S. Pat. No. 6,644,703, and US Patent Appl. Publ. No. 2006/0054774, all incorporated herein by reference. A SASO nozzle includes a fluid conduit with a plurality of fins mounted on the internal wall of the conduit. The fins are arranged on opposite sides of the conduit. Each fin mounted on one side of the conduit is positioned opposite a space between two fins on the opposite side. The fins serve to increase the fluid resistance of the conduit, reducing flow for a given applied fluid pressure.

The rigid surface may include a single contiguous platform that supports the entire area of the substrate, several separate parallel rails, or a combination of contiguous platforms and rails. Such a non-contact conveyance system as adapted to a heating application is described by Yassour et al. in US Patent Appl. Publ. No. 2008/0145190, which is incorporated herein by reference.

The distribution of pressure and vacuum ports may be continuous. For example, the rigid surface may be porous rigid surface through which pressurized fluid is injected. Alternatively, the distribution may be discrete, for example, by distributing pressure and vacuum nozzles over the rigid surface with a particular distribution. When a thin flat object, such as a substrate, is placed on the rigid surface with a pressure-vacuum (PV) or pressure supply, a thin cushion of fluid is created between the object and the rigid surface. The fluid may be gas or liquid. The fluid cushion produced prevents the object from contacting the rigid surface, and may tend to hold the object at an approximately fixed distance from the surface.

A continuous supply of fluid, quantified by the mass flow rate (MFR) of the fluid, may be required during the conveying process. The continuous supply of fluid may maintain the pressure field between the object and the rigid surface. Typical values of the thickness ($\epsilon$) of the cushion of fluid may vary from about 1 µm to about 2 mm. The required MFR to maintain a given fluid cushion pressure field is proportional to $\epsilon^3$. Therefore, a fluid cushion thickness may be limited by practical limitations on the MFR to a range of 20 µm to 200 µm for a PV configuration, and 60 µm to 600 µm for a□ pressure-only configuration.

A uniform $\epsilon$ and a uniform supporting force on the object may be achieved by uniformly distributing the pressure and vacuum supply over the area of the rigid surface. However, a uniform fluid cushion may not necessarily be advantageous. A thin flat object with a large area may be somewhat flexible. The mechanical stiffness of the object may not be sufficient to maintain its shape when supported by a uniform pressure field. Placement of such a flexible substrate on a fluid cushion with a predetermined pressure field distribution may result in large scale deformation of the object. Deformation of the object may lead, in turn, to non-uniform application of a process being performed on the object. Such a process may include, for example, heat transfer, cleaning, or etching. In order to reduce or prevent such deformation, evacuation slits may be located on the rigid surface to assist in configuring the fluid cushion to counteract any tendency of the object to bend or deform. The evacuation slits may be arranged, for example, parallel to a motion path of the object. The fluid pressure in the evacuation slits may be at, or close to, atmospheric pressure. For example, ports along the evacuation slits may open to the surrounding atmosphere or to a source at a low vacuum pressure.

However, prevention of large scale deformation may not be sufficient in the presence of local deformation of the object. For example, near the edges or corners of a flat object, edge effects in the fluid cushion near the borders of the object may lead to deflection or bending of edges or corners of the object. In addition, a thin flat object supported by a fluid cushion pressure field may be subject to undesirable dynamic phenomena. For example, a pneumatic hammer effect may result from an instability caused by an interaction of the compressibility of a gaseous fluid and mechanical vibration of the object. In particular, such an effect may occur where there is resonance between natural vibration frequencies of the object and of the fluid cushion.

Deflection of an edge or corner of the object may be especially undesirable in the vicinity of obstacles in path along which the object is conveyed. Such an obstacle may include a gap in the rigid surface and fluid cushion, or a protruding projection, such as a drive wheel (as described by Yassour in US Patent Appl. Publ. No. 2008/0302637).

A gap in the fluid cushion may result from a gap in the rigid surface, such as gaps between nearby sections of a conveyance system. If the gap is small, an object may be conveyed across the gap despite bending of the object. However, in some applications, for example inspection, a wide gap may be required. The leading edge of an object being conveyed across a wide gap may be deflected downward by the force of gravity. The amount of the deflection may depend on such factors as the elastic modulus of the object, its moment of inertia, its speed, and the width of the gap. In the event that the amount of deflection of the leading edge is more than ϵ, the width of the fluid cushion, the leading edge may contact or strike the rigid surface. Contact with the rigid surface may cause damage to the object, to the surface, or to both. On the other hand, when an obstacle protrudes out of the surface and the leading edge of the object is not deflected sufficiently to avoid the obstacle, the object may collide with the obstacle.

For example, a typical FPD material may be a sheet of glass with a thickness of 0.7 mm. A typical value of ϵ may be, for example, about 100 μm. A gap that such a sheet of glass may cross without colliding with the surface may be limited to a width of about 80 mm, based on a simplified calculation. With a wider gap, the leading edge of the glass sheet may bend toward the surface by more than ϵ, and may collide with a rigid surface. In practice, dynamic phenomena and edge effects may significantly increase the amount of bending and decrease the size of the maximum allowable gap.

Therefore, there is a need for a non-contact platform that can reduce deformation of a thin object being conveyed, and that avoids collision of the object with the edges of gaps or other obstacles.

It is an object of the present invention to provide a system and method for controlling the support of a thin object by a non-contact platform so as to reduce deformation of the object, and to safely convey the object over gaps and obstacles.

Other aims and advantages of the present invention will become apparent after reading the present invention and reviewing the accompanying drawings.

SUMMARY OF THE INVENTION

There is thus provided, in accordance with some embodiments of the present invention, a non-contact support platform system for supporting a substantially flat object. The system includes a platform with a first plurality of pressure ports and a first plurality of vacuum ports for inducing a fluid cushion to support the object at a distance from the platform. The system further includes a second plurality of pressure ports located at a predetermined zone of the platform for increasing the distance of the object from the platform at the predetermined zone.

Furthermore, in accordance with some embodiments of the present invention, the predetermined zone is an edge zone.

Furthermore, in accordance with some embodiments of the present invention, the edge zone is designed to support an edge of the object which is substantially perpendicular to a direction of motion of the object.

Furthermore, in accordance with some embodiments of the present invention, the edge zone is designed to support a lateral edge of the object.

Furthermore, in accordance with some embodiments of the present invention, the predetermined zone is a corner zone.

Furthermore, in accordance with some embodiments of the present invention, the system is further provided with a second plurality of vacuum ports at the predetermined zone.

Furthermore, in accordance with some embodiments of the present invention, wherein the first plurality and second plurality of the pressure ports include a plurality of nozzles.

Furthermore, in accordance with some embodiments of the present invention, each nozzle of the plurality of nozzles includes a conduit with flow restricting fins.

There is further provided, in accordance with some embodiments of the present invention, a method for conveying a substantially flat object. The method includes providing a non-contact support platform system for supporting a substantially flat object. The system includes a platform with a first plurality of pressure ports and a first plurality of vacuum ports for inducing a fluid cushion to support the object at a distance from the platform, and a second plurality of pressure ports located at a predetermined zone of the platform. The method further includes increasing the distance of the object from the platform at the predetermined zone by applying pressure forces by the second plurality of the pressure ports.

Furthermore, in accordance with some embodiments of the present invention, the predetermined zone is an edge zone.

Furthermore, in accordance with some embodiments of the present invention, the method includes supplying pressure to the second plurality of pressure ports that is greater than the pressure supplied to the first plurality of pressure ports.

Furthermore, in accordance with some embodiments of the present invention, the step of supplying pressure to the second plurality of pressure ports that is greater than the pressure supplied to the first plurality of pressure ports is executed when an edge of the object is supported at the predetermined zone.

Furthermore, in accordance with some embodiments of the present invention, the method includes supporting an edge of the object which is substantially perpendicular to a direction of motion of the object.

Furthermore, in accordance with some embodiments of the present invention, the method includes supporting a lateral edge of the object.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

FIG. 7B is a schematic front cross-section of a corrugated flexible object formed by the pattern of pressure and vacuum shown in FIG. 7a.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

In a non-contact conveyance system, in accordance with embodiments of the present invention, ports or outlets for injection of pressurized fluid, and for application of vacuum, are distributed over a rigid non-contact support surface. The ports may be in the form of an arrangement of distinguishable nozzles, or in the form of a porous surface. Some of the nozzles, or a portion of the porous surface, may be connected to a supply of pressurized fluid, such as air, for example. Other nozzles, or another portion of the porous surface, may be connected to a vacuum, providing a suction toward which fluid may be evacuated. In addition, evacuation ports may be distributed over the rigid surface. Evacuation ports may be connected to an opening at the ambient atmospheric pressure, or to a source of low pressure vacuum that is close to atmospheric pressure.

The distribution of pressure, vacuum, and evacuation ports may create a cushion of fluid over the rigid surface. The fluid cushion may exert a force on a thin flat object may be placed on the fluid cushion. The force may support or hold the object at a distance above the rigid surface. An object thus supported may be conveyed over the fluid cushion without contacting the rigid surface.

A fluid cushion may be designed to provide a fluidic spring effect with bidirectional stiffness by selection of a suitable ratio of flow resistance in the vacuum and pressure ports. For example, a typical value of the ratio of pressure port flow resistance to vacuum port flow resistance may be 2:1. It is, however, possible to achieve bidirectional stiffness whenever the pressure port flow resistance is substantially larger than the vacuum port flow resistance. An object supported by a fluid cushion with bidirectional stiffness tends to remain at particular nominal distance from the rigid surface. When the object is at the nominal distance, pressure forces tending to push the object away from the rigid surface, and vacuum forces tending to pull the object toward the rigid surface, are approximately balanced. When the distance between the object and the rigid surface deviates substantially from the nominal distance, the forces are no longer balanced, and a net force is applied on the object that tends to return it to the nominal distance.

Figure 1A:
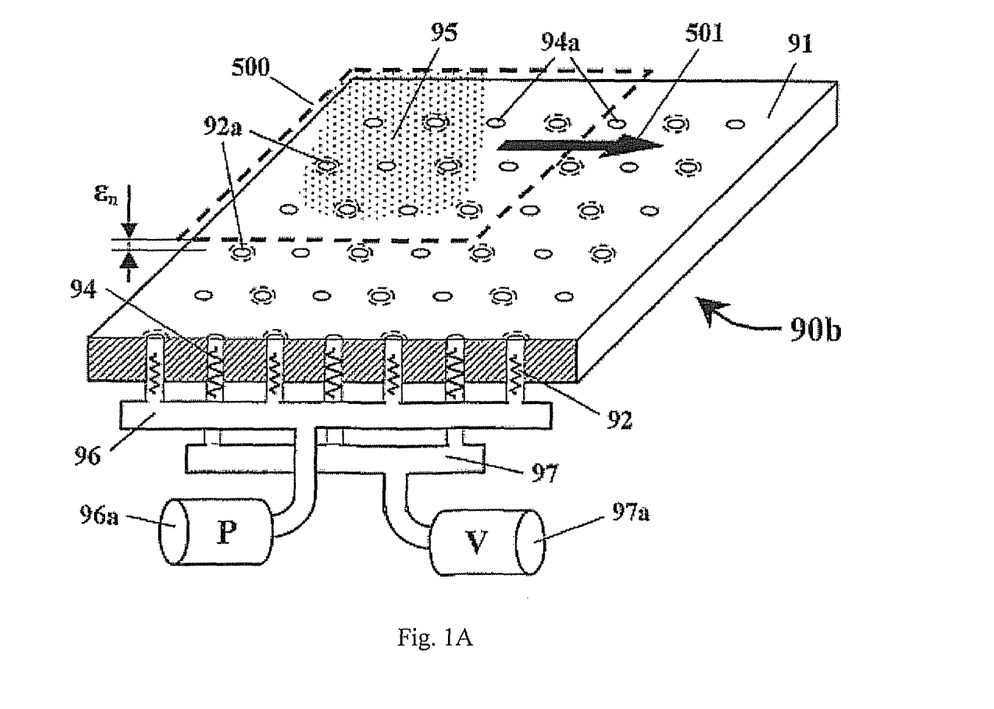
FIG. 1A illustrates a non-contact support platform system for supporting and conveying a flat object (PRIOR ART).

A non-contact support and conveyance platform system, in accordance with embodiments of the present invention, is based on similar designs previously described, for example, by US Patent Appl. Publ. No. 2006/0054774. FIG. 1A illustrates a non-contact support platform system for supporting and conveying a flat object (PRIOR ART, copied from US Patent Appl. Publ. No. 2006/0054774). Non-contact support platform system 90b is of the PV type. A pressure source 96a of pressurized fluid, such as pressurized air, is connected via pressure manifold 96 to one or more pressure nozzles 92a distributed over rigid non-contact support surface 91. Pressure nozzles 92a may include pressure flow restrictors 92, possibly in the form of SASO nozzles. Similarly, vacuum source 97a may be connected via vacuum manifold 97 to one or more vacuum ports 94a distributed over rigid non-contact support surface 91. Vacuum ports 94a may similarly include vacuum flow restrictors 94. Alternatively or in addition, pressure source 96a and vacuum source 97a may connect to a porous section of rigid non-contact support surface 91. The action of the pressure and vacuum may create fluid cushion 95 between flat object 500 and rigid non-contact support surface 91. Fluid cushion 95 may then support flat object 500 a distance $\epsilon_n$ above rigid non-contact support surface 91. Flat object 500 may be conveyed along rigid non-contact support surface 91, for example, in the direction indicated by 501.

In accordance with some embodiments of the present invention, the local properties of the fluid cushion may vary from location to location over the rigid surface. For example, the flow of fluid through an individual pressure or vacuum port, or through a group of neighboring ports, may be determined in accordance with the location of the port on the rigid surface. Alternatively, the level of the pressure or vacuum applied to the port may be varied in accordance with the location of a supported object relative to the port. The variation in the pressure applied to a pressure or vacuum port may be designed to locally adjust the configuration of the fluid cushion. The adjusted configuration of the fluid cushion may adjust the supporting force on a specific part of an object being supported by the fluid cushion. For example, pressure through a port may be applied as the object approaches the port, and may be turned off once the object is conveyed past the port.

Specifically, the pressure of the fluid cushion may be adjusted at an edge zone. An edge zone may refer to an edge of the rigid surface, for example at a side edge or at a gap that transects the path along which a supported object is being conveyed. At such a point, the pressure may be adjusted to lift a leading or trailing edge over the gap. Alternatively, an edge zone may refer to a location at the edge of a supported object, or a predetermined location on the rigid surface where such an edge is expected to be found. For example, the force supporting a lateral (approximately parallel to the direction of motion) or other edge at the side of the object may be adjusted. As another example, the force supporting a corner of the object, at a corner zone, may be adjusted. The local adjustment of the forces may assist in preventing undesirable effects with regard to the interaction of the object with the surface.

The modification of the configuration of the fluid cushion may be permanent in a section of the fluid cushion where a particular part of the object is generally located during a particular process. Alternatively, the fluid cushion configuration may be manually or automatically adjusted as the object is conveyed from location to location on the fluid cushion. Automatic configuration may require providing the non-contact support system with one or more automatic controllers and position sensors.

Figure 1B:
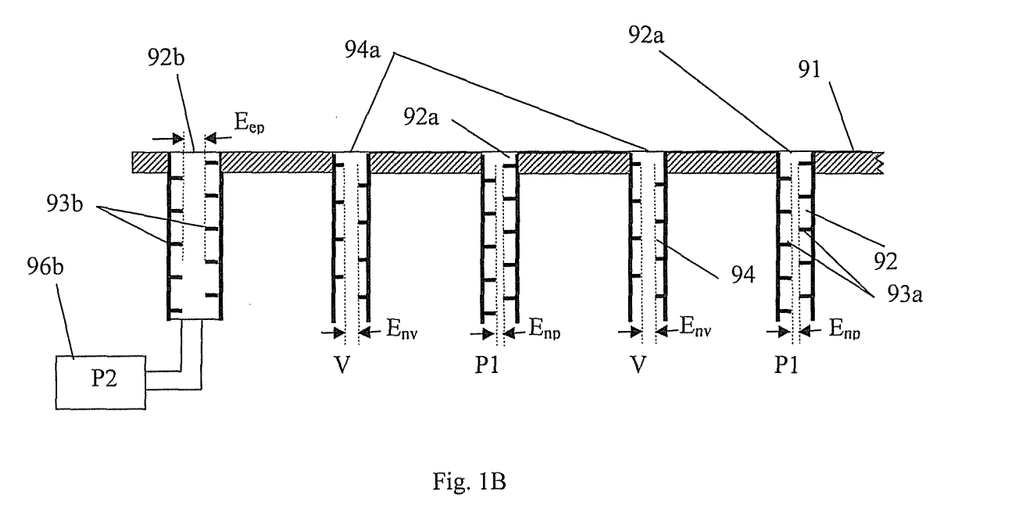
FIG. 1B is a schematic side view of a non-contact support surface where a port near the edge of the surface is connected to a separate pressure source.

FIG. 1B is a schematic side view of a non-contact support surface where a port near the edge of the surface is connected to a separate pressure source. Edge pressure nozzle 92b is located near an edge of rigid non-contact support surface 91. Edge pressure nozzle 92b is connected to an additional pressure source 96b providing pressurized fluid at a pressure P2. Additional pressure source 96b is separate from pressure source 96a (shown in FIG. 1A) that provides pressure nozzles 92a with pressurized fluid at pressure P1. Alternatively, or in addition, separation $E_{ep}$ between flow-restricting fins 93b of a flow restrictor connected to edge pressure nozzle 92b may be greater than separation $E_{np}$ between flow-restricting fins 93a of a pressure flow restrictor 92. Increasing the separation may reduce fluid resistance in edge pressure nozzle 92b, and may increase the flow of fluid for a given applied pressure. (The arrangement of fins in a vacuum flow restrictor 94 may be different from that of either type of pressure flow restrictor.)

Figure 1C:
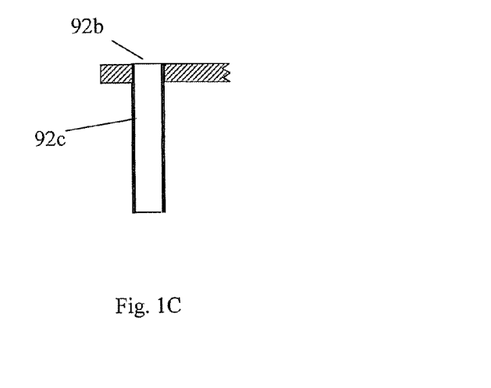
FIG. 1C shows a pressure port without flow-restricting fins.
Figure 1D:
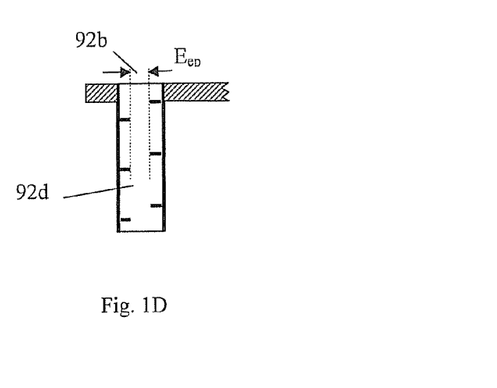
FIG. 1D shows a pressure port with a reduced number of flow-restricting fins.

Alternatively, the fluid resistance of a nozzle may be decreased by modifying the arrangement of a flow resistor in the nozzle. FIG. 1C shows a pressure port without flow-restricting fins. The fluid resistance of finless nozzle 92c, with no flow-restricting fins, may be lower than that of a similarly configured nozzle, such as pressure nozzle 92a (FIG. 1B), that includes fins. FIG. 1D shows a pressure port with a reduced number of flow-restricting fins. Again, the fluid resistance of modified flow restrictor 92d with fewer flow-restricting fins may be less than a similarly configured nozzle, such as edge pressure nozzle 92b (FIG. 1B), with a larger number of fins (FIG. 1B).

Figure 2A:
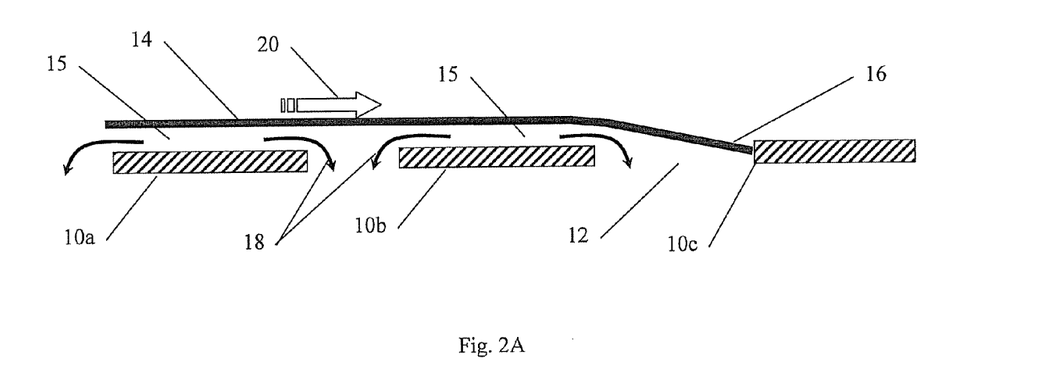
FIG. 2A is a schematic side view of a flexible object being carried by a non-contact support surface and failing to cross a gap in the surface.

In accordance with some embodiments of the present invention, local variations in the configuration of the fluid cushion may be used to convey a supported object over an obstacle. An example of such an obstacle is a gap in the rigid support surface that causes a gap in the fluid cushion. When a thin, flexible object is conveyed across a gap in the fluid cushion, bending of the object may cause the object to collide with a rigid structure, such as the rigid support surface. FIG. 2A is a schematic side view of a flexible object being carried by a non-contact support surface and failing to cross a gap in the surface. Rigid support surfaces 10a and 10b generate a fluid cushion in cushion spaces 15 between rigid support surfaces 10a and 10b and thin object 14. The fluid flow forming the fluid cushion in cushion spaces 15 is indicated by fluid flow arrows 18. Thin object 14 is being conveyed in the direction indicated by arrow 20. Leading edge 16 of thin object 14 is to be conveyed across inter-surface gap 12 to rigid surface 10c. Since no fluid cushion exists over inter-surface gap 12, leading edge 16 is unsupported by a fluid cushion. Therefore, the weight of leading edge 16 may bend it downward. Continued motion of leading edge 16 in the direction of arrow 20 and while bent downward may result in a collision between leading edge 16 and the edge of rigid surface 10c.

Figure 2B:
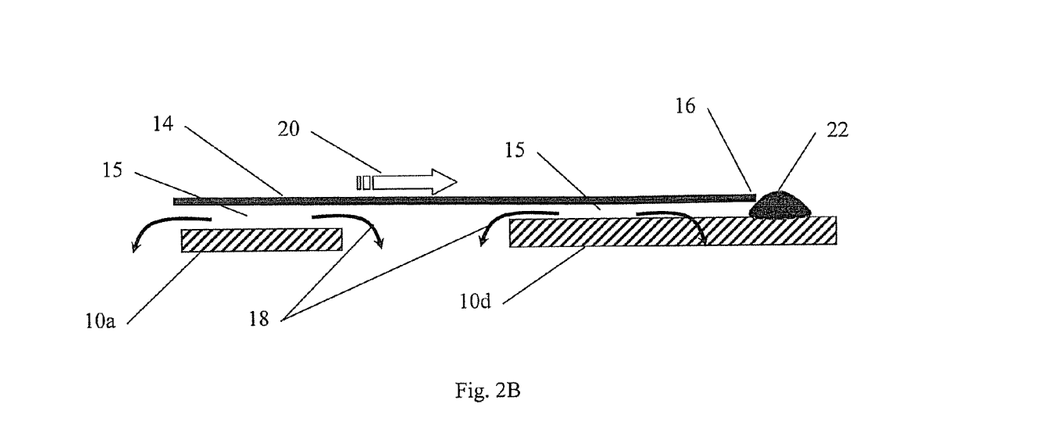
FIG. 2B is a schematic view of a flexible object being carried by a non-contact support surface and failing to cross an obstacle protruding from the surface.

FIG. 2B is a schematic view of a flexible object being carried by a non-contact support surface and failing to cross an obstacle protruding from the surface. Thin object 14 is supported by a fluid cushion in cushion spaces 15 between rigid support surfaces 10a and 10d and thin object 14. Protrusion 22 protrudes from rigid surface 10d beyond the thickness of the fluid cushion. Thin object 14 is being conveyed in the direction indicated by arrow 20. Therefore, leading edge 16 of thin object 14, rather than being conveyed over protrusion 22, may collide with protrusion 22.

In accordance with some embodiments of the present invention, the configuration of a fluid cushion over a rigid surface may be adjusted so as to bend the leading edge of an object being conveyed on the cushion away from the surface. The leading edge often may be approximately perpendicular to the direction in which the object is being conveyed. The bending of the leading edge away from the rigid surface may enable conveying the object across an obstacle such as an inter-surface gap or a protrusion without colliding with the obstacle. The configuration of the fluid cushion may be adjusted, for example, by adjusting the configuration of pressure and vacuum ports over the rigid non-contact support surfaces near the obstacle. For example, the flow of fluid through a portion of the ports may be adjusted so as to modify the configuration of the pressure cushion.

Figure 3:
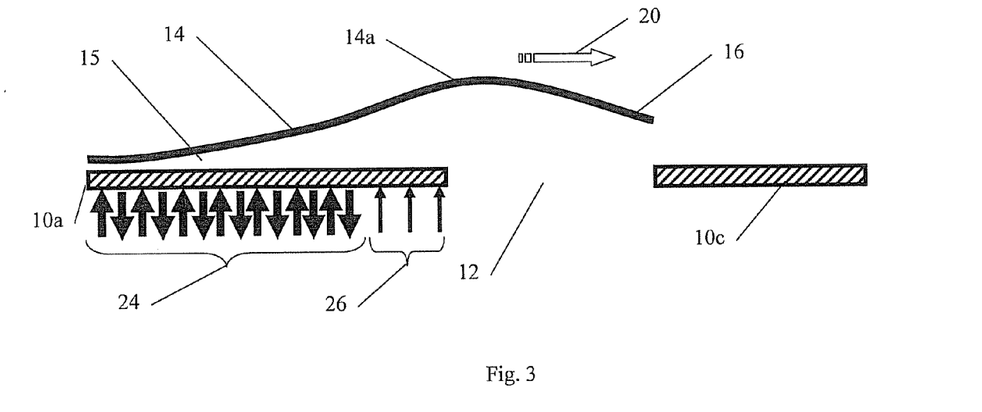
FIG. 3 schematically illustrates the application of pressure to lift the front end of a flexible object across an inter-surface gap, in accordance with some embodiments of the present invention.

FIG. 3 schematically illustrates the application of pressure to lift the front end of a flexible object across an inter-surface gap, in accordance with some embodiments of the present invention. Thin object 14 is being conveyed in the direction of arrow 20 from rigid surface 10a to rigid surface 10c, across inter-surface gap 12. Fluid cushion configuration 24 is applied to a section of rigid surface 10a that is distal to gap 12. In the schematic representation of fluid cushion configuration 24, upwardly pointing arrows represent application of an outward pressure to cause a local outward injection of pressurized fluid. Downwardly pointing arrows represent application of vacuum to cause a local inward evacuation of fluid. Interspersing the application of pressure and vacuum may generate a fluid cushion with bidirectional stiffness that tends to hold thin object 14 at an approximately fixed distance from rigid surface 10a.

Fluid cushion configuration 26 is applied to a section of rigid surface 10a that is proximal to inter-surface gap 12. In fluid cushion configuration 26, outward pressure dominates, causing a net outward injection of pressurized fluid. Lifted section 14a of thin object 14 is situated above fluid cushion configuration 26. The net outward injection of fluid applies a force on lifted section 14a in a direction away from rigid surface 10a. The remainder of thin object 14 may be held near rigid surface 10a by means of bidirectional stiffness of fluid cushion configuration 24, or by means of the weight of thin object 14. Thus, a torque is applied to thin object 14 that tends to move lifted section 14a away from rigid surface 10a. Moving lifted section 14a of thin object 14 away from rigid surface 10a may raise leading edge 16 of thin object 14 above inter-surface gap 12. Thus, although the weight of leading edge 16 may cause leading edge 16 to bend downward, leading edge 16 may be conveyed across inter-surface gap 12 to rigid surface 10c without colliding with the edge of rigid surface 10c. Similarly, causing a leading edge of a thin object to move away from the rigid surface may enable the leading edge to be conveyed over a protruding obstacle without colliding with the obstacle.

Figure 4:
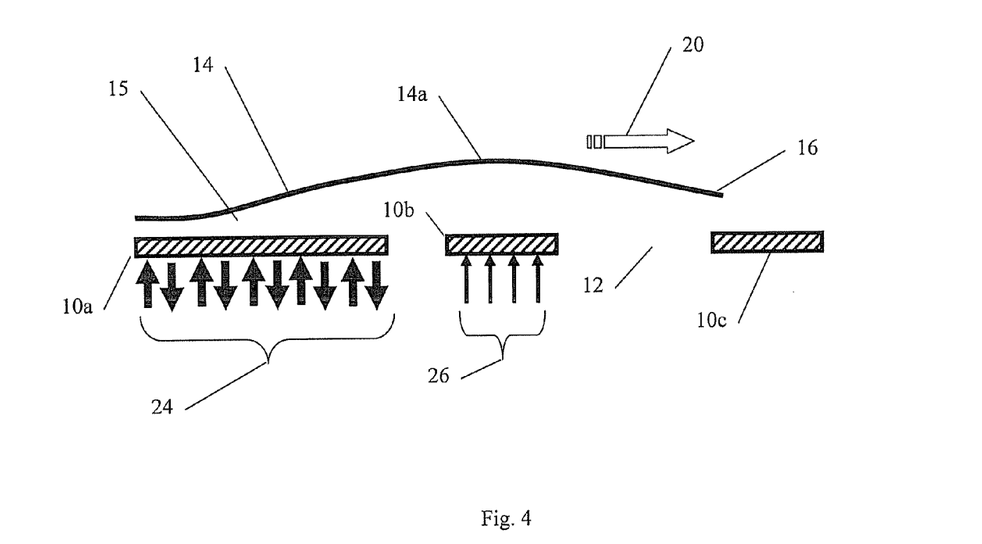
FIG. 4 schematically illustrates the application of pressure by an additional surface to lift the front end of a flexible object across an inter-surface gap, in accordance with some embodiments of the present invention.

FIG. 4 schematically illustrates the application of pressure by an additional surface to lift the front end of a flexible object across an inter-surface gap, in accordance with some embodiments of the present invention. Again, thin object 14 is being conveyed in the direction of arrow 20 from rigid surface 10a to rigid surface 10c, across inter-surface gap 12. Fluid cushion configuration 24, possibly providing bidirectional stiffness, is applied to rigid surface 10a, and may tend to hold thin object 14 at an approximately fixed distance from rigid surface 10a. An additional separate rigid surface 10b is provided before inter-surface gap 12. Fluid cushion configuration 26 is applied to additional rigid surface 10b. In fluid cushion configuration 26, outward pressure dominates, causing a net outward injection of pressurized fluid. Lifted section 14a of thin object 14 is situated above fluid cushion configuration 26. The net outward injection tends to move lifted section 14a away from rigid surface 10b. Moving lifted section 14a of thin object 14 away from rigid surface 10b may raise leading edge 16 of thin object 14 above inter-surface gap 12. Thus, although the weight of leading edge 16 may cause leading edge 16 to bend downward, leading edge 16 may be conveyed across inter-surface gap 12 to rigid surface 10c without colliding with the edge of rigid surface 10c.

Figure 5:
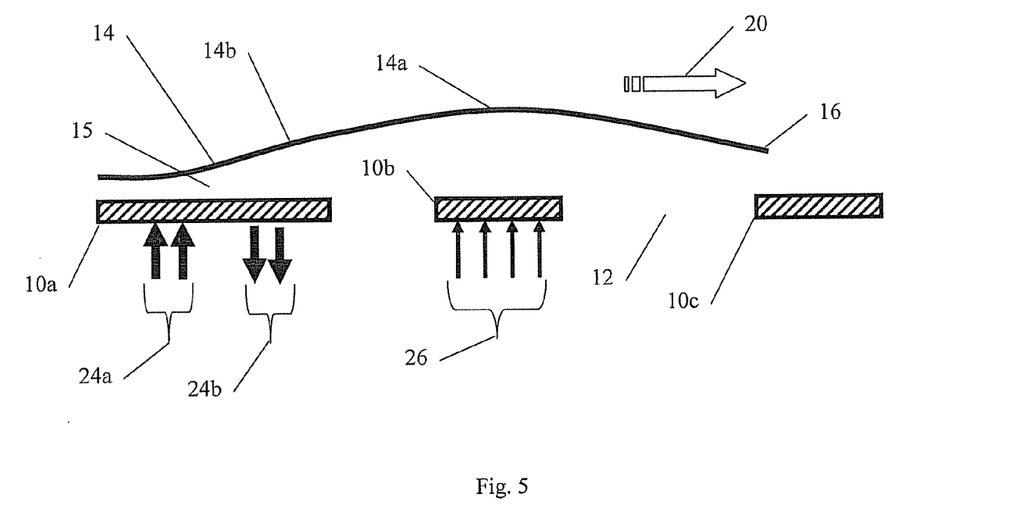
FIG. 5 schematically illustrates a variation of the application of pressure shown in FIG. 4, in accordance with some embodiments of the present invention.

FIG. 5 schematically illustrates a variation of the application of pressure shown in FIG. 4, in accordance with some embodiments of the present invention. Thin object 14 is being conveyed in the direction of arrow 20 from rigid surface 10a to rigid surface 10c, across inter-surface gap 12. An additional rigid surface 10b is provided before inter-surface gap 12. In fluid cushion configuration 26, applied to additional rigid surface 10b, outward pressure injection dominates. Fluid cushion configuration 24a is applied to a section of rigid surface 10a that is distal to rigid surface 10b. In fluid cushion configuration 24a, outward pressure injection dominates. Fluid cushion configuration 24b is applied to a section of rigid surface 10a that is proximal to rigid surface 10b. In fluid configuration 24b, inward vacuum evacuation pressure dominates. Lifted section 14a of thin object 14 is situated above fluid cushion configuration 26 on rigid surface 10b. The net outward injection tends to move lifted section 14a away from rigid surface 10b. The combination of outward injection in fluid cushion configuration 26 and inward evacuation in fluid cushion configuration 24b may apply a torque to thin object 14. The applied torque may tend to move lifted section 14a of thin object 14 away from rigid surface 10b, while pulling pulled section 14b toward rigid surface 10a. In this manner, leading edge 16 of thin object 14 may be raised above inter-surface gap 12. Thus, although the weight of leading edge 16 may cause leading edge 16 to bend downward, leading edge 16 may be conveyed across inter-surface gap 12 to rigid surface 10c without colliding with the edge of rigid surface 10c.

Figure 6:
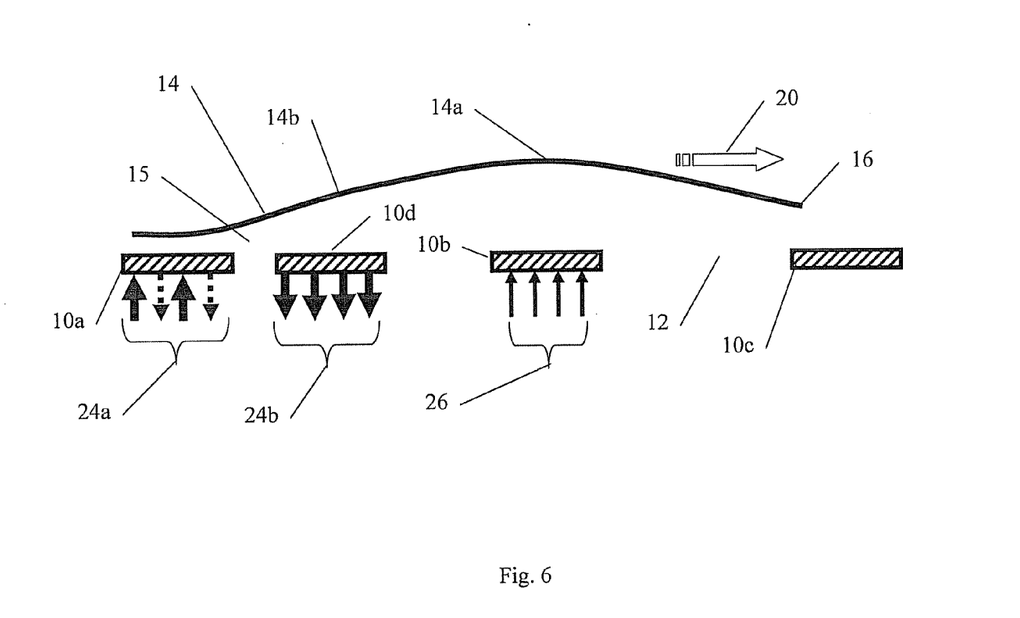
FIG. 6 schematically illustrates a variation of the application of pressure shown in FIG. 5, in accordance with some embodiments of the present invention.

FIG. 6 schematically illustrates a variation of the application of pressure shown in FIG. 5, in accordance with some embodiments of the present invention. In order to convey thin object 14 in the direction of arrow 20 across inter-surface gap 12, additional rigid surface 10b is provided. Fluid cushion configuration 26, in which outward fluid injection dominates, is applied to additional rigid surface 10b. However, whereas in the configuration illustrated in FIG. 5, fluid cushion configurations 24a and 24b are applied to a single rigid surface, in the configuration illustrated in FIG. 6, fluid cushion configurations 24a and 24b are applied to separate rigid surfaces 10a and 10d. Fluid cushion configuration 24a, applied to rigid surface 10a, may include a dominant outward injection pressure, or may include vacuum interspersed with the outward pressure. In fluid configuration 24b, applied to rigid surface 10d, inward fluid evacuation dominates. Lifted section 14a of thin object 14 is situated above fluid cushion configuration 26 on rigid surface 10b. The net outward injection tends to move lifted section 14a away from rigid surface 10b. The combination of outward injection in fluid cushion configuration 26 and inward evacuation in fluid cushion configuration 24b applies a torque to thin object 14. The applied torque tends to move lifted section 14a of thin object 14 away from rigid surface 10b, while pulling pulled section 14b toward rigid surface 10a. In this manner, leading edge 16 of thin object 14 may be raised above inter-surface gap 12. Thus, although the weight of leading edge 16 may cause leading edge 16 to bend downward, leading edge 16 may be conveyed across inter-surface gap 12 to rigid surface 10c without colliding with the edge of rigid surface 10c.

Alternatively, rather than configuring the fluid cushion configuration to lift the leading edge of a thin object over a gap, the fluid cushion may be configured to increase the stiffness of the thin object, in accordance with some embodiments of the present invention. Increasing the stiffness of the thin object may reduce the bending of the thin object. Reducing the bending of the thin object may reduce the effect of the weight of the object on its leading edge. Bending of the leading edge toward the rigid support surface may thus be reduced, enabling the leading edge to be conveyed across a gap without a collision.

Figure 7A:
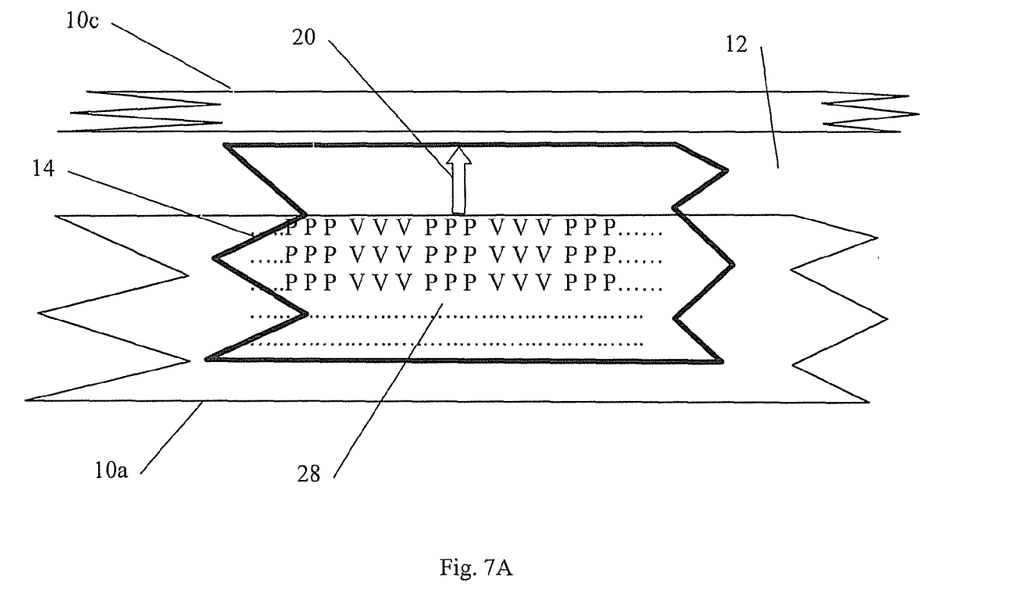
FIG. 7A shows a schematic top view of the application of a pattern of pressure and vacuum to impose longitudinal corrugation on a flexible object, in accordance with some embodiments of the present invention.
Figure 7B:
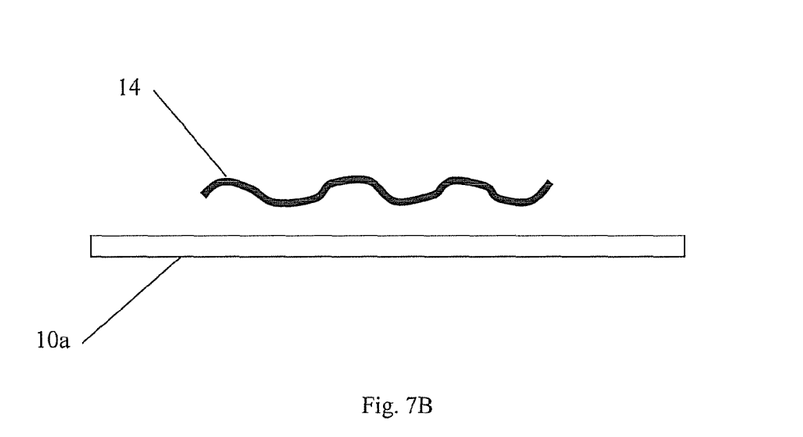

One way of increasing the stiffness of the thin object is to corrugate the object. For example, the object may be corrugated longitudinally, with the ridges and grooves of the corrugation being oriented parallel to the direction in which the object is being conveyed. FIG. 7A shows a schematic top view of the application of a pattern of pressure and vacuum to impose longitudinal corrugation on a flexible object, in accordance with some embodiments of the present invention. Thin object 14 is being conveyed in the direction of arrow 20 from rigid surface 10a to rigid surface 10c, across inter-surface gap 12. Fluid cushion configuration 28 is applied to rigid surface 10a. In FIG. 7A, "P" indicates the application of outward injection of pressurized fluid, and "V" indicates the application of evacuation by inward vacuum flow. The dots at the ends of the pattern indicate that the pattern of application of pressure and vacuum may continue beyond the indicated area. A row of outward pressure injection in fluid cushion configuration 28 may tend to push a parallel strip of thin object 14 upward. Similarly, a row of inward vacuum flow in fluid cushion configuration 28 may tend to pull a parallel strip of thin object 14 downward. A periodic pattern of repeating rows of outward and inward flow may form a periodic pattern of ridges and grooves on thin object 14, thus corrugating thin object 14. FIG. 7B is a schematic front cross-section of a corrugated flexible object formed by the pattern of pressure and vacuum shown in FIG. 7a. The cross section shows that thin object 14 is corrugated, with longitudinal ridges and grooves. The corrugation of object 14 may increase its resistance to bending along the grooves, i.e., in the longitudinal direction. The resistance to bending may enable the conveying of object 14 across inter-surface gap 12.

Figure 8:
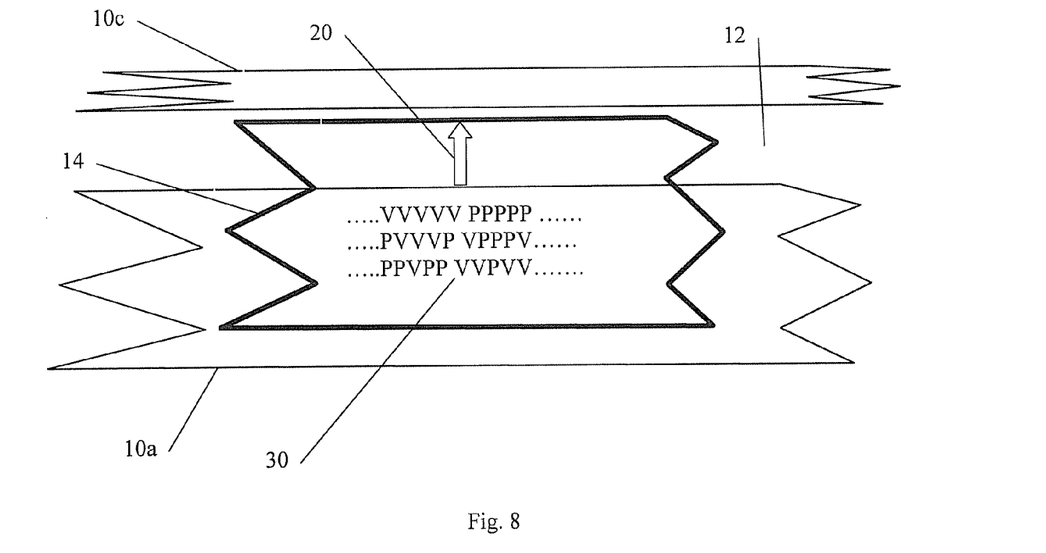
FIG. 8 shows a schematic top view of a variation of the application of pressure and vacuum shown in FIG. 7A, in accordance with some embodiments of the present invention.

FIG. 8 shows a schematic top view of a variation of the application of pressure and vacuum shown in FIG. 7A, in accordance with some embodiments of the present invention. Fluid cushion configuration 30 is applied to rigid surface 10a. Fluid cushion configuration 30 applies outward pressure flow and inward vacuum flow in a periodic pattern. For example, the pattern may be a diamond pattern of alternating outward pressure flow and inward vacuum flow. The imposed pattern may impose a similar pattern of bumps and depressions on thin object 14. Imposition of such a periodic pattern of bumps and depressions on thin object 14 may increase the stiffness of thin object 14. Increasing the stiffness of thin object 14 may enable conveying thin object 14 across inter-surface gap 12.

Embodiments of the present invention may be utilized to adjust the configuration of a fluid cushion of a non-contact support surface in order to reduce distortion of a thin object being supported. For example, the configuration of the fluid cushion may be adjusted to reduce bending of an edge or corner of an object being supported. Such adjustment may include adjusting the distribution of pressure ports that provide an outward injection flow of pressurized fluid and of vacuum ports that provide an inward evacuation flow of fluid. Such adjustment may also include adjusting the pressure or the rate of outward or inward flow through each various pressure and vacuum port in accordance with the location of the port. Such adjustment may be utilized to provide a fluid cushion that is able to support all parts of a thin flexible object without significant bending or other distortion. Eliminating significant distortion may contribute to improving the results of a process applied to the object while it is being supported on the fluid cushion. A distribution of evacuation ports at approximately atmospheric pressure may reduce discontinuity of the fluid cushion by reducing or eliminating a need for long evacuation slits.

Figure 9A:
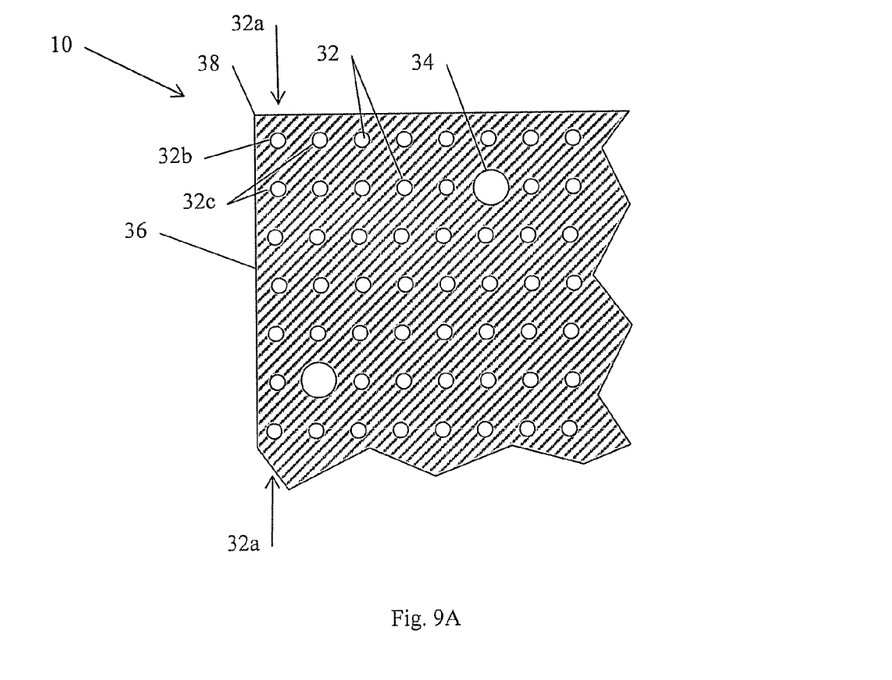
FIG. 9A represents a section of a rigid surface with fluid ports arranged in the form of a rectangular matrix.
Figure 9B:
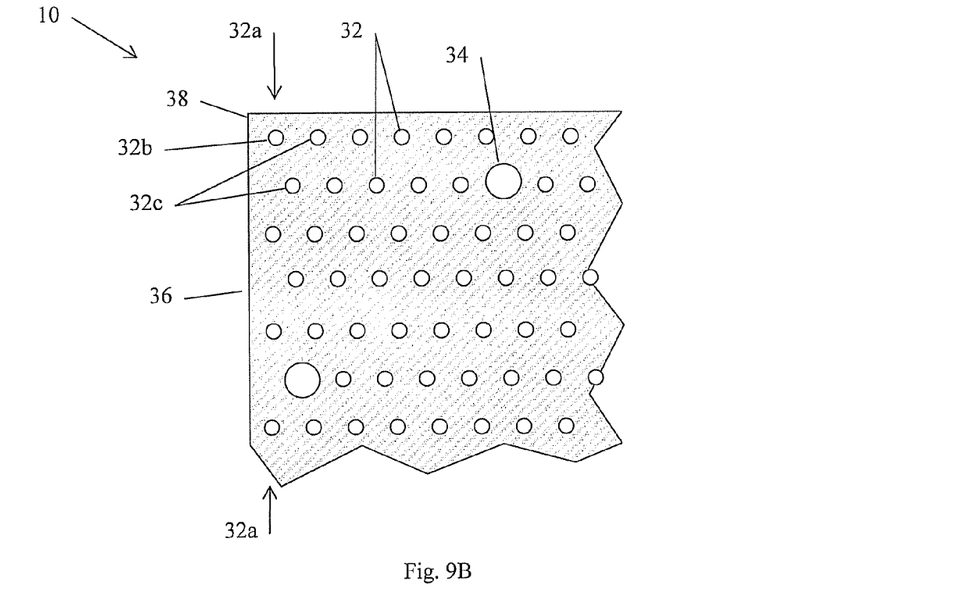
FIG. 9B represents a section of a rigid surface with fluid ports arranged in the form of a staggered matrix pattern.
Figure 9C:
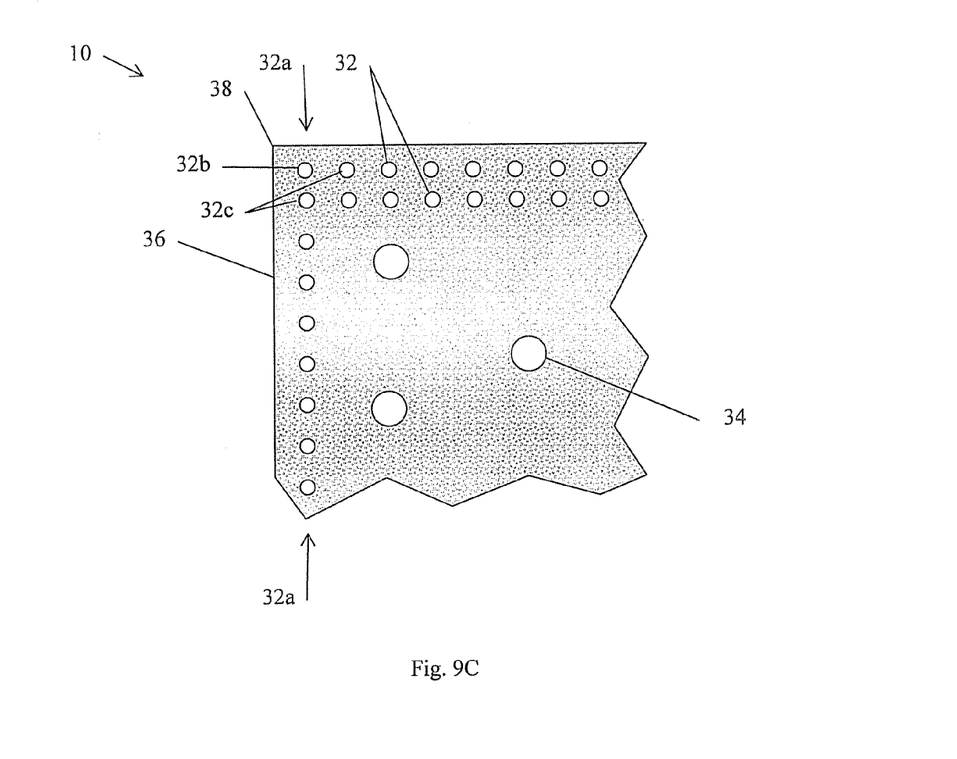
FIG. 9C represents a section of a rigid surface with ports distributed over a porous surface.

FIG. 9A represents a section of a rigid surface with fluid ports arranged in the form of a rectangular matrix. FIG. 9B represents a section of a rigid surface with fluid ports arranged in the form of a staggered matrix pattern. FIG. 9C represents a section of a rigid surface with ports distributed over a porous surface. FIG. 9A, FIG. 9B, and FIG. 9C show a section of rigid surface 10 that may be supporting a corner of a rectangular object. Each port 32 of rigid surface 10 may be connected to a source of outwardly flowing pressurized fluid injection, or to an evacuating vacuum source. An approximately uniform distribution of pressure and vacuum may form an approximately uniform fluid cushion under a middle section of a flat object. Evacuation ports 34 are approximately at atmospheric pressure. At the edge of a flat object, however, the non-isotropic distribution of ports 32 relative to the edge may result in a local reduction of the lifting capability of the fluid cushion. For example, at edge 36 of a rectangular object, the weight of the edge may cause it to sag toward rigid surface 10. Increasing the average outward pressure or flow through the ports in column 32*a* relative to other columns may reduce the sagging of edge 36. Similarly, corner 38 of a rectangular object may sag. Providing an increased (relative to other pressure ports on the surface) high outward flow of pressurized fluid through port 32*b*, and providing a reduced inward flow through ports 32*c* may reduce the sagging of corner 38.

In some cases, a dynamic effect such as a pneumatic hammer effect may occur. For example, if a dynamic effect occurs at corner 38, adjusting the pressure of the flow through port 32*b* may reduce or eliminate the dynamic effect.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A non-contact support platform system for supporting a substantially flat object, the system comprising:
    a first platform with a first plurality of pressure ports in the form of nozzles with flow restricting fins interspersed with a first plurality of vacuum ports for inducing a bi-directionally stiff fluid cushion to support the object at a substantially fixed distance from the first platform, the first platform including a second plurality of pressure ports located at an edge zone of the first platform to apply pressure forces to increase a distance between a section of the object and the first platform at the edge zone; and
    a second platform that includes pressure ports in the form of nozzles with flow restricting fins interspersed with vacuum ports for inducing a bi-directionally stiff fluid cushion to support the object at a substantially fixed distance from the second platform, the second platform being separated from the first platform by a gap, such that the object is conveyable across the gap from the first platform to the second platform when the pressure forces are applied by the second plurality of the pressure ports to the section of the object.

2. The system of claim 1, wherein the edge zone is designed to support an edge of the object which is substantially perpendicular to a direction of motion of the object.

3. The system of claim 1, wherein the edge zone is designed to support a lateral edge of the object.

4. The system of claim 1, wherein the edge zone is a corner zone.

5. The system of claim 1, further provided with a second plurality of vacuum ports at the edge zone.

\* \* \* \* \*